(12) United States Patent
Sakakibara et al.

(10) Patent No.: US 8,249,933 B2
(45) Date of Patent: Aug. 21, 2012

(54) CHARGING SYSTEM OF ELECTRIC POWERED VEHICLE

(75) Inventors: Katsumi Sakakibara, Seto (JP); Yukio Okamura, Nagoya (JP); Kenji Mori, Nishikamo-gun (JP); Yutaka Matsumoto, Toyota (JP); Chitose Shibata, Nishikamo-gun (JP); Yoshitaka Asakura, Toyohashi (JP); Akihiko Kido, Toyota (JP); Tetsuhiro Ishikawa, Nishikamo-gun (JP); Hiroyuki Yamada, Nagoya (JP); Kiichi Iwasaki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 894 days.

(21) Appl. No.: 12/292,441

(22) Filed: Nov. 19, 2008

(65) Prior Publication Data

US 2009/0144150 A1 Jun. 4, 2009

(30) Foreign Application Priority Data

Dec. 3, 2007 (JP) ................................ 2007-312534

(51) Int. Cl.
*G06Q 30/00* (2012.01)
*G05B 19/418* (2006.01)

(52) U.S. Cl. ........................ 705/14.62; 701/22; 340/988

(58) Field of Classification Search .................. 320/109; 701/22; 340/988
See application file for complete search history.

(56) References Cited

U.S. PATENT DOCUMENTS

| 6,181,991 B1 * | 1/2001 | Kondo et al. ................... 701/22 |
| 6,864,807 B2 * | 3/2005 | Todoriki et al. ............... 340/988 |

FOREIGN PATENT DOCUMENTS

| JP | A-2001-250190 | 9/2001 |
| JP | A-2001-343249 | 12/2001 |
| JP | A-2002-162237 | 6/2002 |
| JP | A-2002-350153 | 12/2002 |
| JP | A-2002-352137 | 12/2002 |
| JP | A-2003-18255 | 1/2003 |
| JP | A-2003-132424 | 5/2003 |
| JP | A-2003-134886 | 5/2003 |
| JP | A-2004-69318 | 3/2004 |
| JP | A-2006-140688 | 6/2006 |
| JP | A-2006-178259 | 7/2006 |

OTHER PUBLICATIONS

"Forecasting the marketing of electrical vehicles in California using conjoint analysis". Segal Robin. Energy Journal. V16. N3. p. 89.1995.*
Nov. 4, 2009 Office Action issued in Japanese Patent Application No. 2007-312534 (with translation).

* cited by examiner

*Primary Examiner* — Victoria Vanderhorst
(74) *Attorney, Agent, or Firm* — Oliff & Berridge, PLC

(57) ABSTRACT

An electric storage device of an electric powered vehicle is configured to be chargeable by a charging facility. At the time of external charge by the charging facility, a management server selects advertising information based on information stored inside the electric powered vehicle to be charged and/or information of the charging facility performing the external charge to the electric powered vehicle including a mechanism capable of reproducing the advertising information from an advertising provider, and transmits the selected advertising information. The management server performs billing so that in exchange for the transmission of the advertising information, at least part of a charging power fee is caused to be borne by the advertising provider side to thereby discount an amount borne by an electric powered vehicle user.

9 Claims, 6 Drawing Sheets

US 8,249,933 B2

CHARGING SYSTEM OF ELECTRIC POWERED VEHICLE

This nonprovisional application is based on Japanese Patent Application No. 2007-312534 filed on Dec. 3, 2007 with the Japan Patent Office, the entire contents of which are hereby incorporated by reference.

BACKGROUND OF THE INVENTION

1. Field of the Invention

This invention relates to a charging system of an electric powered vehicle, and more specifically to a charging system of an electric powered vehicle configured to be chargeable by an external charging facility.

2. Description of the Background Art

In recent years, as an eco-friendly vehicle, attentions have been attracted to an electric powered vehicle, such as an electric automobile, a hybrid car, a fuel-cell car and the like, which carries an electric storage device typified by a secondary battery, and as a driving device, has a motor configured so that driving force can be generated by electric power from the electric storage device.

Particularly, with the electric powered vehicle, by constructing the electric storage device such that it can be charged by a electric power source outside the vehicle (hereinafter, also referred to as "external electric power source") during parking, above all, by performing the charge by the external electric power source using midnight power, contribution to control of total traveling cost, and reduction in an amount of greenhouse gas (particularly $CO_2$) emission has been expected. Hereinafter, the charge of the electric storage device by the external electric power source is also referred to simply as "external charge"

Generally, the external charge is executed by electrically connecting between the electric storage device mounted on the electric powered vehicle and the above-described external electric power source through a dedicated charging cable or the like. For example, Japanese Patent Laying-Open No. 2001-250190 (Patent Document 1) has described a configuration in which when a connector of a charger or the like is connected to a vehicle, that is, at the time of external charge, information of a product and service suitable for the vehicle and a user is acquired from an information processing device provided in an information management center to be presented in an information processing device provided in the vehicle.

Moreover, as an art related to the present invention, Japanese Patent Laying-Open No. 2003-18255 (Patent Document 2) has described a billing method when a battery of a portable telephone is charged, characterized in that in return for having the battery charged, standby screen data, ringing melody data or the like that is advertisement information of a service company and/or a charging stand is transmitted to a storage device in the portable telephone, and that the use of this data as the display or the ringing melody for a predetermined period waives or discounts payment for the charge.

In view of recently increased social interest in environmental problems including the adoption of Kyoto Protocol, expanded use of the electric powered vehicle having a high reduction effect of greenhouse gas emission, particularly expanded use of external charge, has high social significance.

Accordingly, the realization of a charging system in which increase in merit of external charge for a user of the electric powered vehicle motivates the expanded use has been desired. In this respect, in the configuration of Patent Document 1, a merit of the external charge is only to obtain the information of a product or service suitable for the vehicle and the user, so that there is a concern that an appealing effect is insufficient for the expanded use of the external charge.

SUMMARY OF THE INVENTION

This invention has been made to solve the above-described problem, and an object of this invention is to establish a charging system of an electric powered vehicle capable of giving incentive for external charge to a user of the electric powered vehicle.

A charging system of an electric powered vehicle according to this invention is a charging system of an electric powered vehicle configured to be chargeable by a charging facility outside the vehicle, including a storage unit, first and second information output units, a determination unit, a selection unit, an advertising output unit, and a billing unit. The storage unit stores a plurality of advertising information and a correspondence relation between each of the plurality advertising information and a provider of the relevant advertising information in advance. The first information output unit outputs information indicating whether or not the relevant electric powered vehicle has a predetermined reproduction mechanism capable of reproducing each of the plurality of advertising information at the time of external charge in which the electric powered vehicle is charged by the charging facility. The second information output unit outputs at least one of charged vehicle information stored inside of the relevant electric powered vehicle and facility information of the relevant charging facility at the time of external charge. The determination unit determines whether or not it is external charge to the electric powered vehicle having the reproduction mechanism based on the information outputted from the first information output unit. The selection unit selects at least one of the plurality of advertising information based on the information outputted from the second information output unit when it is the external charge to the electric powered vehicle having the reproduction mechanism. The advertising output unit reads the advertising information selected by the selection unit from the storage unit to output to the electric powered vehicle during the external charge. The billing unit performs billing to the provider and the electric powered vehicle so that at least part of an electric power fee in accordance with the external charge is borne by the provider corresponding to the advertising information selected by the selection unit.

According to the above-described charging system of the electric powered vehicle, by receiving the advertising information selected based on at least one of the charged vehicle information stored inside the relevant electric powered vehicle and the facility information of the relevant charging facility at the time of external charge, at least part of the charging power fee can be caused to be borne by the advertising provider. As a result, by giving an economic merit to the user of the electric powered vehicle, incentive for external charge can be enhanced. Also, the advertising provider side, based on the charged vehicle information and/or the facility information, can appropriately select the electric powered vehicle that can be expected in advertising effect and send the advertising information, which makes the acquisition of the advertising provider easy. Furthermore, the motivation for the installation of the charging facility can be given because business by advertising income is also enabled, and contribution to popularization and expansion of the electric powered vehicle by well-developed infrastructure can also be expected.

Preferably, the electric powered vehicle includes a mechanism for displaying the advertising information from the advertising output unit on a display screen of a navigation system, as the reproduction mechanism.

More preferably, the advertising information includes position information, and is displayed in a position corresponding to the position information on the display screen. Alternatively, the charged vehicle information includes at least one of past traveling route information and destination information in the navigation system. Alternatively, the navigation system has a search function of displaying a search result list in which according to an inputted search condition, a facility matching the relevant search condition is shown. The advertising information includes information for boosting up a display order of the corresponding facility in the search result list. Alternatively, the facility information includes at least one of an installation place, an installation personnel and an owner of the charging facility, and an owner of the installation place.

The above-described configuration allows the advertising information to be reproduced efficiently and in an aspect that will increase an adverting effect, in conjunction with the navigation system.

Preferably, the reproduction mechanism reproduces the advertising information outputted to the electric powered vehicle by the advertising output unit during a period when the electric powered vehicle is traveling using electric power.

Alternatively, preferably, the charging system further includes a billing unit. The billing unit bills an advertising fee to the provider corresponding to the selected advertising information, and when the advertising fee is lower than the electric power fee, an amount obtained by subtracting the advertising fee from the electric power fee is billed to the electric powered vehicle.

Preferably, the electric powered vehicle further includes a storage portion that stores information of a frequency with which the advertising information is received from the advertising output unit. Based on the information stored in the storage portion, the billing unit relatively increases an amount of electric power to be charged in accordance with the electric power fee billed to the provider, with respect to the electric powered vehicle that receives the advertising information with a relatively high frequency.

Accordingly, a main advantage of this invention lies in that the charging system of the electric powered vehicle that can give incentive for external charge to the user of the electric powered vehicle can be established.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
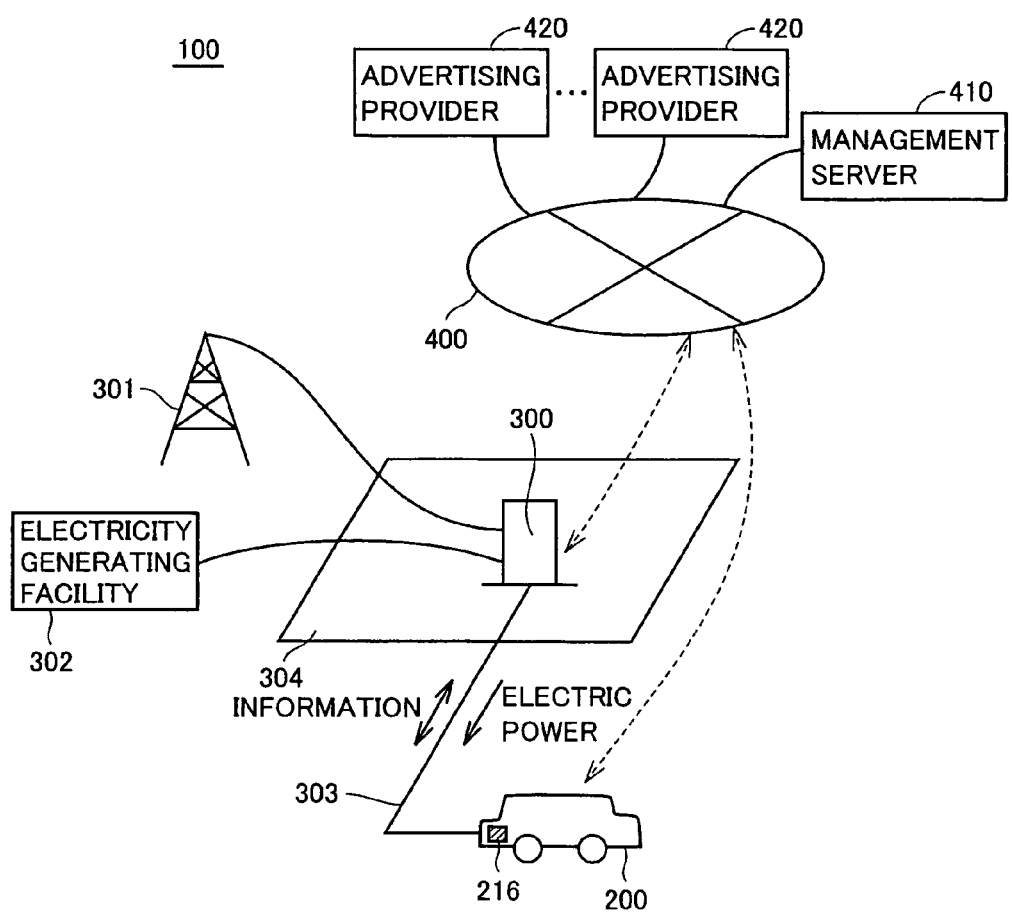
FIG. 1 is a schematic block diagram showing a configuration example of a charging system of an electric powered vehicle according to an embodiment of the present invention.

Hereinafter, referring to the drawings, an embodiment of the present invention is described in detail. Hereinafter, the same or equivalent parts in the drawings are given the same reference numerals and signs, and in principle, description thereof is not repeated.

FIG. 1 is a schematic block diagram showing a configuration example of a charging system of an electric powered vehicle according to the embodiment of the present invention.

Referring to FIG. 1, charging system 100 according to the embodiment of the present invention includes an electric powered vehicle 200, a charging facility 300, a communication network 400 configured in a wired manner or a wireless manner, a management server 410, and advertising providers 420 each having a device that can access communication network 400.

Electric powered vehicle 200 includes an electric storage device 216. Electric storage device 216 is configured to be externally charged by being electrically connected to charging facility 300 provided outside the vehicle through a feeder cable 303. At the time of external charge, information can be transmitted and received bi-directionally between electric powered vehicle 200 and charging facility 300 by power line communication or communication through a communication cable integrated with feeder cable 303, or the like.

As charging power at the time of external charge, charging facility 300 uses system electric power from a system electric power source 301 of an electric power company and electric power from an electricity generating facility 302 of so-called clean energy such as solar light, wind power and the like. At the time of the external charge, authentication processing for precisely recognizing electric powered vehicle 200 to be charged is executed, and when the authentication processing is completed normally, the charging power for charging the electric storage device is supplied from charging facility 300 to electric powered vehicle 200.

Furthermore, charging facility 300 is configured to transmit and receive information bi-directionally with respect to management server 410 through communication network 400. Also, communication between electric powered vehicle 200 and communication network 400 is enabled by a vehicle communication function such as a G-BOOK (registered trademark) and the like. Moreover, communication network 400 can also be accessed by a portable telephone of an owner of the electric powered vehicle or the like. That is, it should be confirmed that no aspect of communication network 400 is particularly limited, as long as it can execute desired communication described below.

As described in detail later, in charging system 100, advertising information is transmitted to electric powered vehicle 200 including a mechanism capable of reproducing the advertising information as electronic information data from advertising provider 420 at the time of external charge by charging facility 300. The operation is performed such that in exchange for the transmission of the advertising information, part or all of a charging power fee (at least part) is caused to be borne by advertising provider 420 side, by which the billing to the electric powered vehicle user is discounted. Furthermore, which of advertising providers 420 the advertising information is to be transmitted from is selected, based on information (vehicle information) stored inside electric powered vehicle 200 to be charged and/or information (facility information) of charging facility 300 performing the external charge.

The above-described vehicle information and facility information can be transmitted from electric powered vehicle 200 and/or charging facility 300 to communication network 400 at the time of external charge. At this time, information of an owner of an installation place 304 of charging facility 300 can be included in the facility information.

Charging facility 300 is representatively a charging device (charging stand) exclusively for electric powered vehicle 200. In view of a merit on advertising provider 420 side, it is preferable that charging facility 300 be utilized by an unspecified number of electric powered vehicles 200 for widely acquiring transmission destinations of the advertising information. For example, charging facility 300 is provided in a left-luggage office, and in a parking area of a commercial facility, amusement facility, public facility and the like. Alternatively, charging facility 300 may be arranged in an aspect in which it is attached to a vending machine.

Electric powered vehicle 200 stores the transmitted advertising information in a storage device (not shown in FIG. 1) therein at the time of external charge, and mainly during traveling, reproduces the stored advertising information. This allows the advertising information from advertising provider 420 to be communicated to a passenger of electric powered vehicle 200.

Hereinafter, details of the respective components of the system shown in FIG. 1 will be described. First, referring to FIGS. 2 to 4, a configuration of electric powered vehicle 200 is described.

Figure 2:
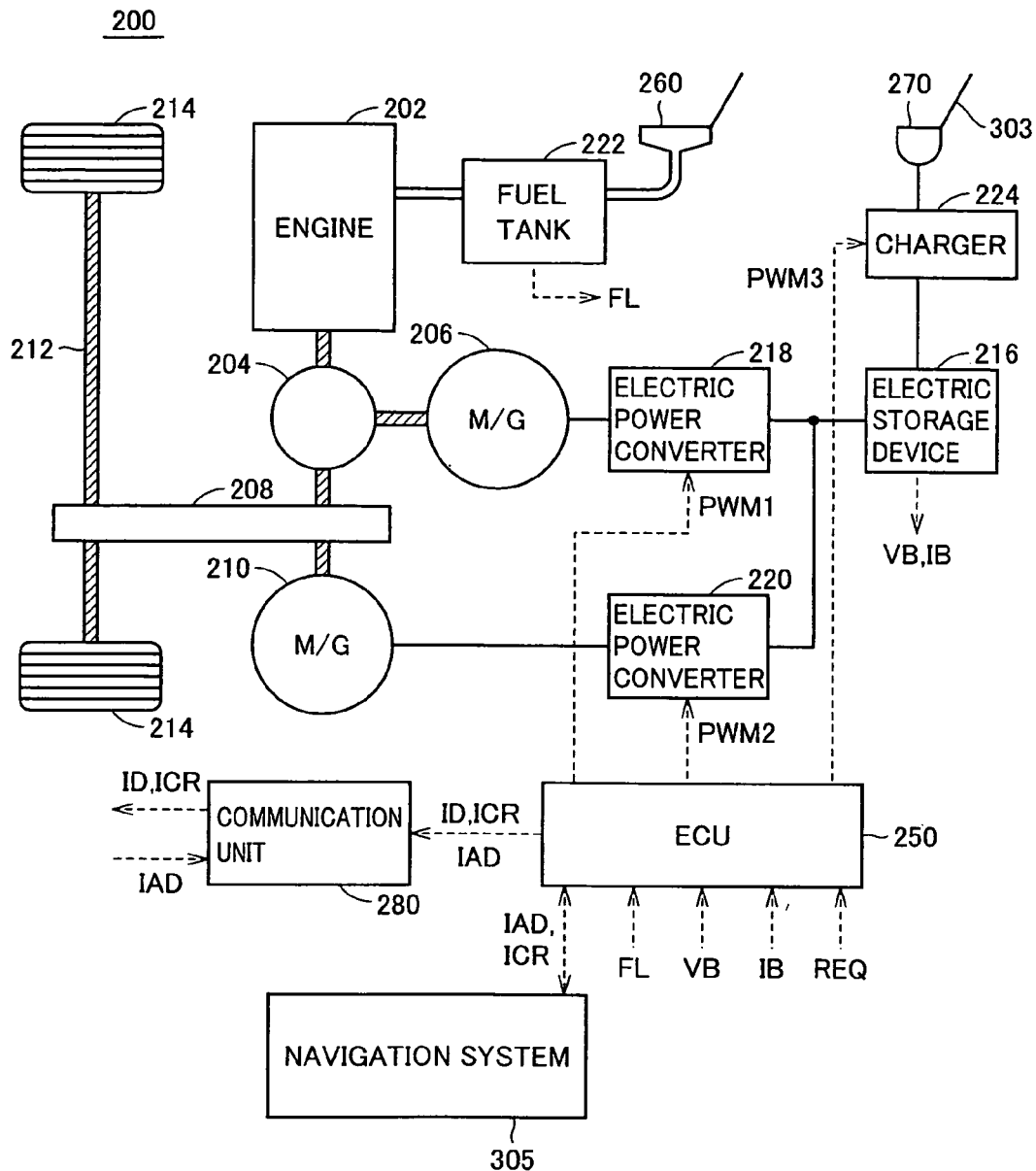
FIG. 2 is a functional block diagram for describing a configuration example of the electric powered vehicle shown in FIG. 1.

FIG. 2 is a functional block diagram for describing a configuration example of electric powered vehicle 200 shown in FIG. 1. While in FIG. 2, an example where electric powered vehicle 200 is a hybrid car is described, electric powered vehicle 200 indicates a concept containing a vehicle configured to be capable of traveling using electric power charged externally, such as a hybrid car, an electric automobile, a fuel automobile and the like, each of which has a different configuration from that of FIG. 2.

Referring to FIG. 2, electric powered vehicle 200 includes an engine 202, a power split mechanism 204, motor generators 206, 210, a transmission gear 208, a driving shaft 212, and wheels 214. Moreover, electric powered vehicle 200 further includes electric storage device 216, electric power converters 218, 220, a fuel tank 222, a fuel compensating port 260, a charger 224, an ECU (Electronic Control Unit) 250, a charging connector 270, a communication unit 280 and a navigation system 305.

Power split mechanism 204 is coupled to engine 202, motor generator 206, and transmission gear 208 to split power among them. For example, a planetary gear having three rotary shafts of a sun gear, a planetary carrier, and a ring gear can be used as power split mechanism 204, and these three rotary shafts are connected to rotary shafts of engine 202, motor generator 206, and transmission gear 208, respectively.

Kinetic energy created by engine 202 is distributed between motor generator 206 and transmission gear 208 by power split mechanism 204. That is, engine 202 is incorporated in electric powered vehicle 200 as a power source that drives transmission gear 208 transmitting the power to driving shaft 212, and also drives motor generator 206. Motor generator 206 is incorporated in electric powered vehicle 200 as a component that operates as a motor driven by engine 202, and that operates as a motor capable of starting engine 202. Moreover, motor generator 210 is incorporated in electric powered vehicle 200 as a power source driving transmission gear 208 that transmits the power to driving shaft 212.

Electric storage device 216 is a chargeable/dischargeable DC power source, and is made of a secondary battery of nickel hydrogen, lithium ion and the like, for example. Electric storage device 216 supplies electric power to electric power converters 218, 220. Moreover, electric storage device 216, at the time of electricity generation of motor generator(s) 206 and/or 210, receives electric power from electric power converter(s) 218 and/or 220 to be charged.

Furthermore, at the time of the external charge when charging connector 270 is connected to charging facility 300 (FIG. 1) through feeder cable 303, electric storage device 216 is charged by receiving electric power from charger 224, which converts electric power from charging facility 300 to the charging power of electric storage device 216.

As electric storage device 216, a large-capacitance capacitor can also be employed, and any device may be employed as long as it is an electric power buffer that can temporarily store the generated electric power by motor generators 206, 210 and the electric power from the external electric power source, and can supply the stored electric power to motor generators 206, 210. An output voltage VB and an input/output current IB of electric storage device 216 are detected by a sensor not shown, and detected values thereof are sent out to ECU 250.

Electric power converter 218 converts the electric power generated by motor generator 206 to DC power based on a signal PWM1 from ECU 250 to output to electric storage device 216. Electric power converter 220 converts DC power supplied from electric storage device 216 to AC power based on a signal PWM2 from ECU 250 to output to motor generator 210. When engine 202 is started, electric power converter 218 converts DC power supplied from electric storage device 216 to AC power based on signal PWM1 to output to motor generator 206. Moreover, when acceleration of the vehicle is reduced at braking time or on a down slope, electric power converter 220 converts electric power generated by motor generator 210 to DC power based on signal PWM2 to output to electric storage device 216.

Motor generators 206, 210 are AC motors, and are each made of, for example, a three-phase AC synchronous motor in which a permanent magnet is buried in a rotor. Motor generator 206 converts kinetic energy generated by engine 202 to electric energy to output to electric power converter 218. Moreover, motor generator 206 creates driving force by three-phase AC power received from electric power converter 218 to start engine 202.

Motor generator 210 creates driving torque of the vehicle by three-phase AC power received from electric power converter 220. Moreover, when acceleration of the vehicle is reduced at braking time or on a down slope, motor generator 210 converts dynamical energy stored in the vehicle as kinetic energy and potential energy to electric energy to output to electric power converter 220.

Engine 202 converts thermal energy by combustion of a fuel to kinetic energy of moving elements such as a piston, a rotor and the like, and the converted kinetic energy outputs power split mechanism 204. For example, if the moving element is a piston, and the motion is a reciprocating motion, the reciprocating motion is converted to rotary motion through a so-called crank mechanism, and the kinetic energy of the piston is transmitted to power split mechanism 204. As a fuel of engine 202, a hydrocarbon-based fuel such as gasoline, light oil, ethanol, liquid hydrogen, and natural gas, or a liquid or gas hydrogen fuel is preferable.

Fuel tank 222 stores the fuel from supplied fuel compensating port 260, and supplies the stored fuel to engine 202. A fuel remaining amount FL inside fuel tank 222 is detected by a sensor not shown, and the detected value is outputted to ECU 250. Charger 224 converts electric power from the external electric power source provided to charging connector 270 to the charging power of electric storage device 216 based on a signal PWM3 from ECU 250 to output to electric storage device 216.

ECU 250 generates signals PWM1, PWM2 for driving electric power converters 218, 220, and outputs generated signals PWM1, PWM2 to electric power converters 218, 220, respectively. Moreover, upon receiving a signal REQ requesting the charge of electric storage device 216 by charger 224, ECU 250 generates signal PWM3 for driving charger 224, and outputs generated signal PWM3 to charger 224.

The configuration for the external charge of electric powered vehicle 200 is not limited to the example in FIG. 2, but any configuration can be applied as long as it can convert the electric power from charging facility 300 to the charging power of electric storage device 216 during parking. For example, a configuration may be such that the arrangement of charger 224 exclusively for the external charge is omitted, and the electric power from the external electric power source provided to charging connector 270 is converted to the charging power of electric storage device 216 by electric power converters 218, 220.

Furthermore, ECU 250 controls a traveling mode of electric powered vehicle 200. That is, ECU 250 controls the switching between traveling by stopping engine 202 to use only motor generator 210 (motor traveling mode) and traveling by operating engine 202 (hybrid traveling mode) (hereinafter, the motor traveling mode is also referred to "EV mode", and the hybrid traveling mode is also referred to as "HV mode".

Moreover, ECU 250 can also generate and manage information of the traveling using the electric power and information of fuel efficiency, based on a fuel remaining amount FL of fuel tank 222 and respective detection values of voltage VB and current IB of electric storage device 216, or further based on another information not shown, and can display the information on a display not shown or the like.

Communication unit 280 corresponds to communication equipment for executing electric power line communication or bi-directional communication with charging facility 300 through a communication cable integrated with feeder cable 303 or the like, or a vehicle communication function facility such as G-BOOK (registered trademark) at the time of external charge.

Figure 3:
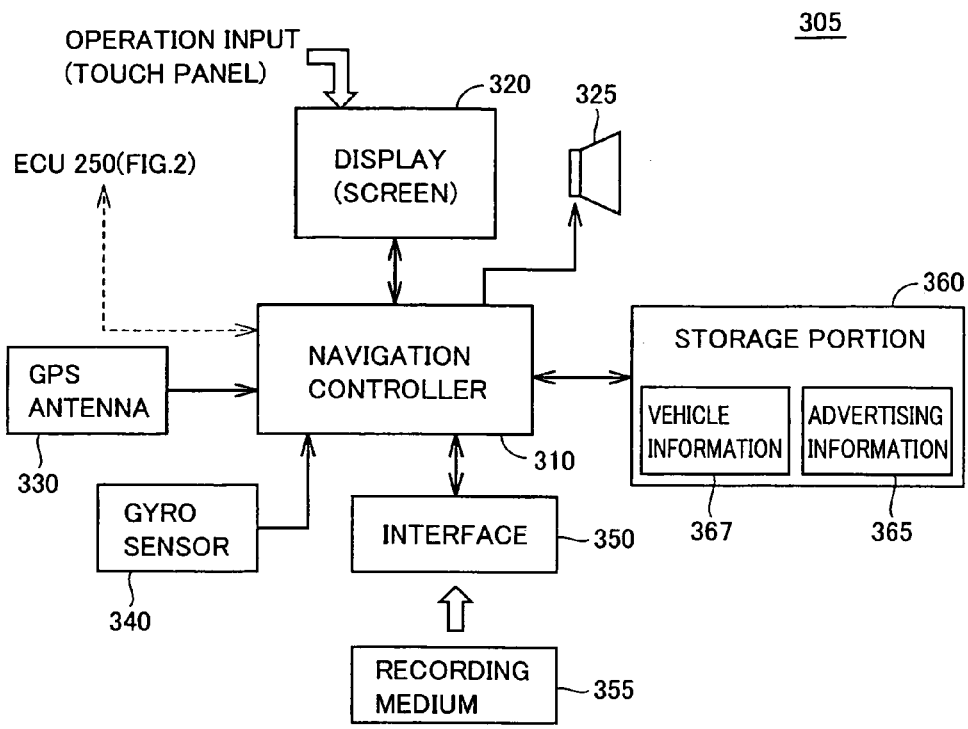
FIG. 3 is a block diagram for describing a configuration example of a navigation system shown in FIG. 2.

Next, a configuration example of navigation system 305 is described by using FIG. 3.

Referring to FIG. 3, navigation system 305 includes a navigation controller 310, a display 320, a speaker 325, a GPS antenna 330, a gyro sensor 340, an interface unit 350, and storage portion 360.

Navigation controller 310 performs setting processing for setting a destination based on operation of a passenger, and performs search processing for setting a traveling route from a stating point to the destination. Specifically, navigation controller 310 obtains information of the destination set by the passenger from display 320 including a touch display.

Moreover, navigation controller 310 reads road map data recorded on a recording medium 355 such as a CD, DVD and the like through interface unit 350.

Navigation controller 310 grasps a current position of electric powered vehicle 200 using GPS antenna 330 and gyro sensor 340, and displays the current position on display 320 with the current position overlapping the road map data. Furthermore, navigation controller 310 performs navigation operation in which the traveling route is searched from the current position to the destination to be displayed. Moreover, navigation controller 310 can also output audio information from speaker 325 as needed.

Storage portion 360 is, for example, a HDD, and is configured to store electronic information data. The above-described road map data may be stored in storage portion 360. At this time, navigation controller 310 reads the road map data stored in storage portion 360.

Furthermore, storage portion 360 includes a storage area 365 in which advertising information IAD transmitted as the electronic information data is stored, and a storage area 367 in which vehicle information ICR is stored. Storage areas 365 and 367 indicate areas in which advertising information IAD and vehicle information ICR can be stored separately. Accordingly, storage areas 365 and 367 may be configured in the same storage device or may be configured using separate storage devices.

Vehicle information ICR, for example, includes information indicating a route where electric powered vehicle 200 has frequently traveled so far, and information indicating a destination that has frequently been specified. Alternatively, at the time of external charge during trip, the destination set currently, the navigation route to the destination and the like may be displayed as vehicle information ICR.

These pieces of information are generated by navigation controller 310, and are written in storage area 367. Alternatively, navigation controller 310 reads vehicle information ICR from storage area 367 according to an instruction from ECU 250 and sends out the same to ECU 250 at the time of external charge.

Moreover, in charging system 100, advertising information LAD transmitted to electric powered vehicle 200 at the time of external charge is received by communication unit 280 (FIG. 2), and is written in storage area 365 by navigation controller 310 according to an instruction from ECU 250. Advertising information IAD is, for example, electronic information data for reproducing position information of a store of advertising provider 420 and advertisement information (merchandise information, event information and the like) of the store by screen display, in voice or the like in electric powered vehicle 200.

Figure 4:
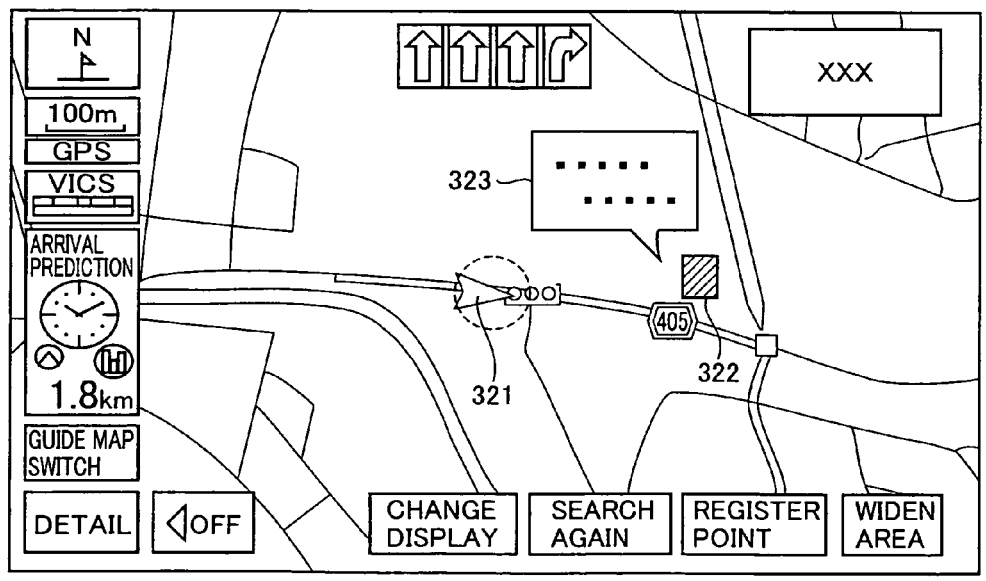
FIG. 4 is a concept diagram showing a display example of advertising information in a display of the navigation system.

For example, as shown in FIG. 4, navigation controller 310 displays position display 322 and/or advertisement information display 323 of the store indicated by advertising information IAD on display 320, overlapping the road map data, in a similar way to a display 321 of the vehicle itself corresponding to a current position of electric powered vehicle 200. Alternatively, navigation controller 310 may output the audio information based on advertising information IAD using speaker 325. This allows advertising information IAD to be reproduced when the vehicle passes through neighborhood of a store/facility or the like of advertising provider 420 during vehicle traveling using navigation system 305, which can bring about an advertisement effect.

Navigation system 305 further has a search function of displaying a facility/store or the like matching a search condition on display 320 in accordance with the search condition inputted using a touch display function of display 320. This search function is realized by a series of processing in which navigation controller 310 executes search processing for an information list of facilities/stores and the like stored in storage portion 360 in advance, in accordance with the search condition inputted in display 320, and further, generates a search list in which the facility/store and the like matching the search condition is shown, and displays the same on display 320.

Advertising information IAD may be data instructing to perform preferential display in which when the specific store/facility or the like related to advertising provider 420 is cited in the search list by the search function, a display order thereof is boosted up. With this configuration, advertising information IAD can be reproduced when the search function by navigation system 305 is used, which can bring about an advertisement effect of the store/facility or the like of advertising provider 420.

In the above-described aspect, electric powered vehicle 200 reproduces advertising information IAD. Moreover, the reproduction of the advertising information may be limited to a specified time zone and be executed, based on reproduction time specifying data included in the relevant advertising information. The reproduction of advertising information IAD by electric powered vehicle 200 may be realized in an aspect other than the above-described example using navigation system 305.

Referring again to FIG. 2, in charging system 100 according to the present embodiment, in order to accept the operation in which in exchange for transmitting advertising information IAD, at least part of a charging power fee is caused to be borne by advertising provider 420 side, a mechanism for reproducing advertising information IAD (hereinafter, also referred to as "advertising reproduction mechanism") needs to be included. For example, navigation system 305 capable of reproducing advertising information IAD as described above corresponds to the advertising reproduction mechanism.

Accordingly, ECU 250 is configured to output a flag FNV indicating whether or not relevant electric powered vehicle 200 includes the above-described reproduction mechanism outside the vehicle through communication unit 280 at the time of external charge. Moreover, ECU 250 outputs vehicle information ICR sent out from navigation system 305 outside the vehicle through communication unit 280. At this time, based on operation indicating a permission by the user of electric powered vehicle 200, or the like, information based on a gender, age, address and the like of a driver may be added to vehicle information ICR.

Furthermore, ECU 250 outputs identification information ID for specifying at least relevant electric powered vehicle 200 outside the vehicle through communication unit 280 at the time of external charge. This allows authentication processing for specifying a charging object by charging facility 300 to be executed.

Moreover, as described above, ECU 250 can receive advertising information IAD as electronic information data from advertising provider 420 through communication unit 280 from the outside of the vehicle. For example, received advertising information IAD is stored in storage portion 360 (FIG. 3) in navigation system 305.

Figure 5:
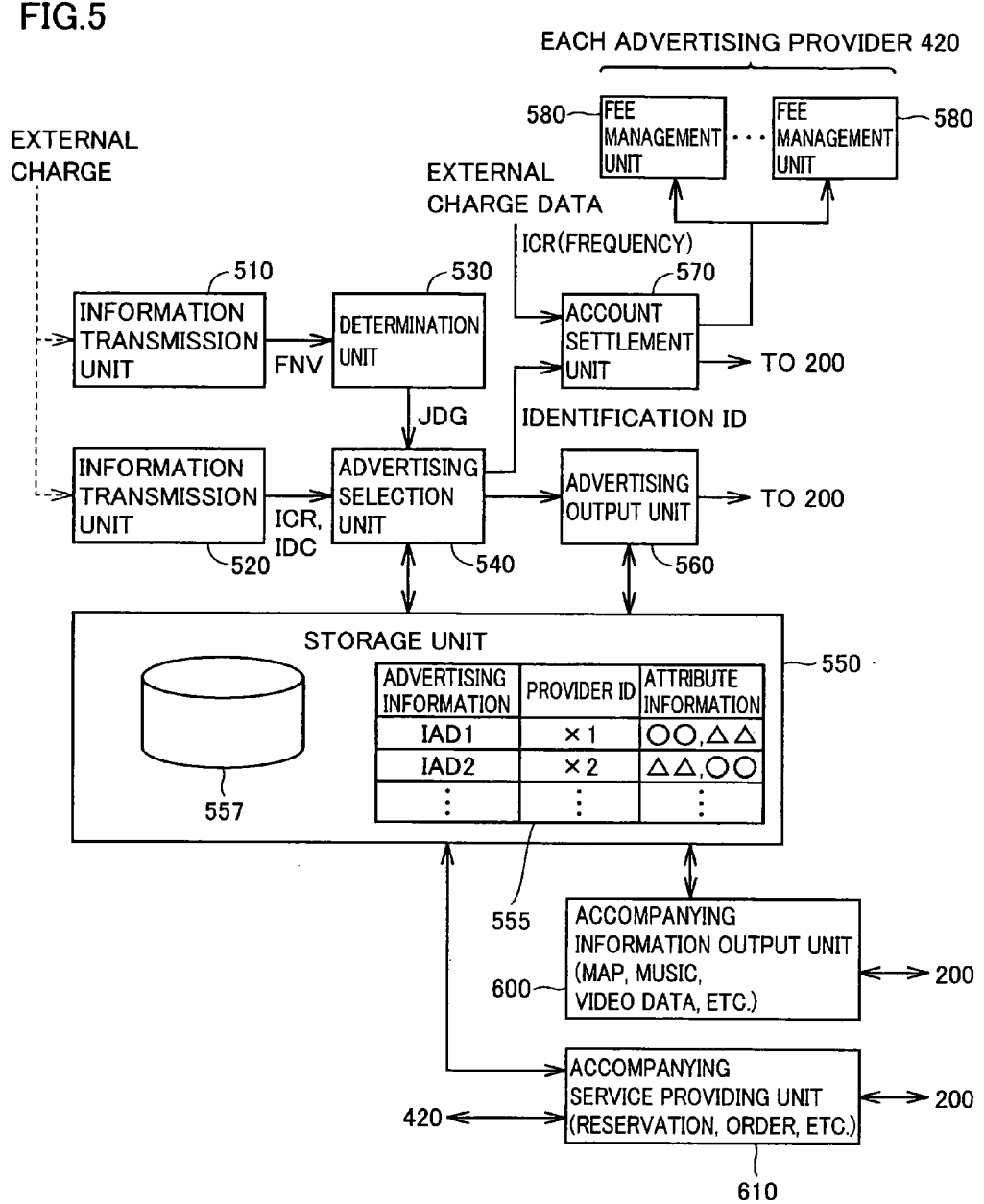
FIG. 5 is a functional block diagram illustrating a configuration for realizing an operation in which at least part of a charging power fee at the time of external charge is caused to be borne by an advertising provider in exchange for the transmission of the advertising information.

FIG. 5 shows a functional block diagram illustrating a configuration for realizing the operation in which at least part of the charging power fee at the time of external charge is caused to be borne by advertising provider 420 in exchange for transmission of the advertising information.

Referring to FIG. 5, an information transmission unit 510, at the time of external charge, for example, when feeder cable 303 is connected, transmits flag FNV indicating whether or not the advertising reproduction mechanism is included, from electric powered vehicle 200 to be charged. The function of information transmission unit 510 is realized by electric powered vehicle 200, representatively by ECU 250 and communication unit 280.

An information transmission unit 520 transmits to an advertising selection unit 540 at least one of vehicle information ICR and facility information IDC of electric powered vehicle 200 and charging facility 300 connected through feeder cable 303 at the time of external charge, respectively. That is, the function of information transmission unit 520 is realized by ECU 250 and communication unit 280 of electric powered vehicle 200 and/or an electronic control unit (ECU) incorporated in charging facility 300.

As described above, vehicle information ICR is representatively information of traveling history of electric powered vehicle 200 to be charged, and in some cases, includes information indicating attributes of an owner/user. Accordingly, based on vehicle information ICR, the advertising information of a store and a service anticipated to be utilized from geographical perspectives of a traveling route and a destination of relevant electric powered vehicle 200, or from perspectives of taste predicted from the gender and age group of the owner/user can be selected.

Facility information IDC includes information of an installation place of charging facility 300, an owner thereof or an owner of installation place 304 and the like. Accordingly, based on facility information IDC, the advertising information of neighborhood of an installation position of charging facility 300 or the owner thereof can be selected.

A determination unit 530 determines whether or not electric powered vehicle 200 to be charged includes the advertising reproduction mechanism based on flag FNV from information transmission unit 510, and outputs a determination result JDG to advertising selection unit 540.

Advertising selection unit 540 selects the advertising information to be outputted to electric powered vehicle 200 based on vehicle information ICR and/or facility information IDC from information transmission unit 520 when electric powered vehicle 200 to be charged is determined to include the advertising reproduction mechanism. A single piece of selected advertising information or a plurality of pieces of information may be selected.

A storage unit 550 stores the respective pieces of advertising information provided from advertising providers 420 and a data table 555 associating identification ID and attribute information of advertising providers 420. The attribute information includes position information indicating a region where the corresponding advertising information is to be provided, user information indicating an object user and the like.

Advertising selection unit 540 can select advertising information IAD matching vehicle information ICR and/or facility information IDC, referring to data table 555. Information for identifying the selected advertising information is transmitted to an advertising output unit 560, and identification ID of advertising provider 420 thereof is transmitted to an account settlement unit 570.

Storage unit 550 further includes a database 557. Database 557 stores electronic information data for reproducing respective pieces of advertising information IAD by the advertising reproduction mechanism of electric powered vehicle 200. Data table 555 and database 557 may be configured in the same storage device, or may be configured by separate storage devices.

Based on the information from advertising selection unit 540, advertising output unit 560 reads the electronic information data corresponding to selected advertising information IAD, which has been stored in database 557, and outputs the same to electric powered vehicle 200 to be charged. Outputted advertising information IAD (electronic information data) is, for example, stored in storage portion 360 shown in FIG. 3, and is reproduced by navigation system 305 during traveling of electric powered vehicle 200.

Account settlement unit 570 receives data of the relevant external charge in addition to identification ID of advertising provider 420 from advertising selection unit 540, when the external charge is finished. This external charge data includes at least data necessary for calculating an electric power fee in accordance with the external charge.

Account settlement unit 570 performs account settlement of the fee so that at least part of the electric power fee in accordance with the external charge is caused to be borne by the provider of the advertising information selected by advertising selection unit 540. An amount obtained by subtracting the fee borne by advertising provider 420, that is, discount fee on electric powered vehicle 200 side from the electric power fee of the external charge is billed to electric powered vehicle 200. The discount fee may be a full amount of the electric power fee, and in this case, the billed amount to electric powered vehicle 200 is zero (i.e., charge-free). When the account settlement for the billing to electric powered vehicle 200 is finished, the external charge by charging facility 300 is finished.

The discount fee on electric powered vehicle 200 side may be a predetermined amount or a predetermined percentage, or may be a variable amount or percentage depending on electric powered vehicle 200 to be charged. For example, by storing a frequency with which electric powered vehicle 200 executed external charge with the reception of the advertising information in charging system 100 in the past, inside of the vehicle as part of vehicle information ICR, for a user performing the above-described external charge with a high frequency, the discount fee may be set to be relatively high.

Alternatively, information of a past utilization state of a store, facility, service and the like of advertising provider 420 may be stored, and the information may be transmitted as part of vehicle information ICR from electric powered vehicle 200 side, by which for a user having a high utilization frequency in the past, the discount fee may be set to be relatively high. In this case, part of the function of information transmission unit 520 may be realized by a portable telephone of the electric powered vehicle user or the like.

The fee borne by each of advertising providers 420 corresponding to the discount fee on the electric powered vehicle side at the time of external charge is integrated by a fee management unit 580 provided corresponding to each of advertising providers 420. The borne fee integrated by fee management unit 580 may be directly charged to each of advertising providers 420, or an aspect in which it is reflected in an advertising fee that each of advertising providers 420 will pay to an operator of charging system 100 may be employed.

Charging system 100, by being further provided with an accompanying information output unit 600, an accompanying service providing unit 610 and the like, can also be configured to be capable of providing another information and service in parallel with the selection and transmission of the advertising information as described above. With this configuration, the enhanced convenience of users allows users of charging system 100 to be expanded.

Accompanying information output unit 600 reads map data, music data, video data and the like stored in storage unit 550 in advance, in parallel with the selection and transmission of the advertising information, and outputs the same to electric powered vehicle 200. For example, the data output by accompanying information output unit 600 is executed in response to a request of the user of electric powered vehicle 200, for a fee, for free, or in exchange for points accumulated in accordance with the utilization of the external charge and the like.

Accompanying service providing unit 610 can perform order and reservation of a merchandise or a service (seat reservation of a restaurant, a movie theater or the like, an appointment with a dentist, an appointment for massage and the like) on line with respect to each of advertising provider 420, based on reference to the data stored in storage unit 550, or by directly communicating with advertising provider 420 through communication network 400 (FIG. 1). This allows the user of electric powered vehicle 200 to receive the accompanying service such as the order, reservation and the like in utilizing charging system 100.

Each of determination unit 530, advertising selection unit 540, storage unit 550, advertising output unit 560, account settlement unit 570, fee management unit 580, accompanying information output unit 600 and accompanying service providing unit 610 is basically realized by execution of a predetermined program in management server 410, however, the configuration may be such that some of blocks are arranged on charging facility 300 side in a decentralized manner and are realized by the ECU incorporated in charging facility 300.

In the configuration of FIG. 5, information transmission unit 510 corresponds to a "first information output unit", and information transmission unit 520 corresponds to a "second information output unit". Furthermore, advertising selection unit 540 corresponds to a "selection unit", and account settlement unit 570 corresponds to a "billing unit".

Figure 6:
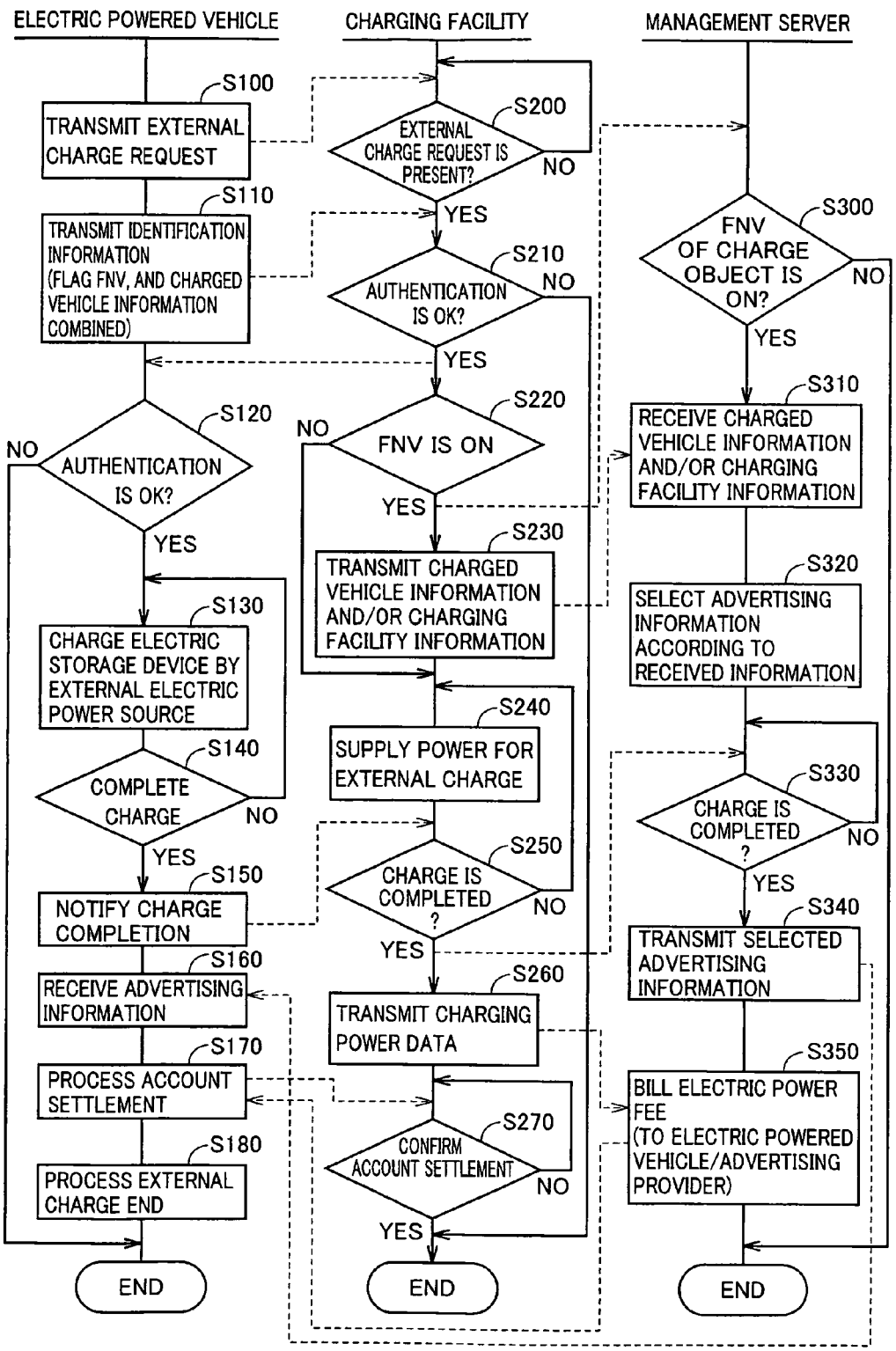
FIG. 6 is a flowchart showing an example of a series of processing at the time of external charge in the charging system according to the present embodiment.

Next, an example of a series of processing at the time of external charge in charging system 100 according to the present embodiment is described using FIG. 6.

Referring to FIG. 6, the electric powered vehicle transmits an external charge request (step S100). The transmission of the external charge request is automatically created, for example, by electrically connecting between electric powered vehicle 200 and charging facility 300 by feeder cable 303. Furthermore, the electric powered vehicle transmits the identification information of electric powered vehicle 200 (step S110). At this time, if electric powered vehicle 200 includes the advertising reproduction function adapted for charging system 100, the above-described flag FNV and vehicle information ICR are outputted in combination. That is, the processing of step S110 corresponds to the functions of information transmission unit 510 or information transmission units 510, 520 in FIG. 5.

Charging facility 300 continuously determines whether the creation of the external charge request from electric powered vehicle 200 is present or absent (step S200). If the external charge request from electric powered vehicle 200 is present (YES is determined in S200), in charging facility 300, the processing is advanced to step S210, in which using the identification information transmitted from electric powered vehicle 200 in step S110, the authentication of whether the external charge of electric powered vehicle 200 by charging facility 300 is enabled or disabled is performed. This authentication needs to be enabled to specify at least electric powered vehicle 200.

In charging facility 300, if the authentication result is OK (YES is determined in S210), flag FNV from electric powered vehicle 200 is subsequently confirmed (step S220). If flag FNV is on (YES is determined in S220) and electric powered vehicle 200 to be charged includes the advertising reproduction mechanism, vehicle information ICR of relevant electric powered vehicle 200 and/or facility information IDC of relevant charging facility 300 are/is transmitted to management server 410 (step S230), and the electric power supply for external charge is started (step S240). The processing in step S230 corresponds to the function of information transmission unit 520 of FIG. 5.

In contrast, if flag FNV is off (NO is determined in step S220) and electric powered vehicle 200 to be charged does not include the advertising reproduction mechanism, the processing in step S230 is skipped and the electric power supply for external charge is started (step S240).

If the authentication result of the charge object is NG (NO is determined in S210), the subsequent processing is unexecuted, and thus the external charge by charging facility 300 is not executed.

In electric powered vehicle 200, the authentication result is confirmed in step S120. If the authentication result is OK (YES is determined in S120), the charge of electric storage device 216 by the external electric power source is started (step S130). During the external charge of electric storage device 216, it is determined whether or not the charge of electric storage device 216 has been completed based on an SOC (State of Charge) of electric storage device 216 and the like (step S140). In step S140, electric storage device 216 by the external electric power source is continuously executed until it is determined that the charge of electric storage device 216 has been completed (while NO is determined in S140). On the other hand, if the authentication result is NG (NO is determined in S120), the subsequent processing is unexecuted, and the external charge of electric storage device 216 is not executed.

When the charge of electric storage device 216 has been completed (YES is determined in S140), electric powered vehicle 200 notifies charging facility 300 of the charge completion (step S150).

In charging facility 300, after the electric power supply for the external charge is started, it is determined whether or not the charge completion is notified from electric powered vehicle 200 (step S250). The electric power supply for the external charge (step S240) is continuously executed until the charge completion is notified from electric powered vehicle 200 (while NO is determined in S250).

When the charge completion is notified from electric powered vehicle 200 (YES is determined in S250), the electric power supply for the external charge is stopped, and further, data for calculating an electric power fee in accordance with the external charge (charging power amount and the like) is transmitted from charging facility 300 to management server 410 (step S260).

In management server 410, whether or not electric powered vehicle 200 to be charged includes the advertising reproduction mechanism is determined based on flag FNV (step S300). The processing in step S300 corresponds to the function of determination unit 530 of FIG. 5.

If electric powered vehicle 200 includes the advertising reproduction function (YES is determined in S300), the processing for selection and transmission of the advertising information and account settlement of the charging power fee is executed through the subsequent steps S310 to S350. On the other hand, if electric powered vehicle 200 does not include the advertising reproduction mechanism (NO is determined in S300), the processing of step S310 to S350 by management server 410 is not executed, and the external charge is executed only between charging facility 300 and electric powered vehicle 200.

In step S310, management server 410 receives vehicle information ICR of relevant electric powered vehicle 200 and/or facility information IDC of relevant charging facility 300, which are transmitted in step S230. Vehicle information ICR of electric powered vehicle 200 may be directly transmitted from electric powered vehicle 200 to management server 410 by communication network 400, without mediation of charging facility 300. Furthermore, in step S320, management server 410 selects the advertising information to be transmitted to electric powered vehicle 200 referring to data table 555 shown in FIG. 5, based on received vehicle information ICR and/or facility information IDC. The processing in step S320 corresponds to the function of advertising selection unit 540 of FIG. 5.

Management server 410, upon being notified of the charge completion from electric powered vehicle 200 (YES is determined in S330), advances the processing to step S340, and transmits the advertising information selected in step S320 to electric powered vehicle 200. The processing in step S340 corresponds to the function of advertising output unit 560 of FIG. 5. Furthermore, in step S350, management server 410 calculates the electric power fee in accordance with the external charge based on the data from charging facility 300 (step S260), and performs the billing of the electric power fee so that at least part (all or part) of the above-described calculated electric power fee is caused to be borne by the provider of the advertising information transmitted to electric powered vehicle 200. That is, the processing in step S350 corresponds to the function of account settlement unit 570 of FIG. 5.

In electric powered vehicle 200, the advertising information transmitted in step S340 is received and stored inside the vehicle (step S160). Furthermore, account settlement processing of the electric power fee billed in step S360 is executed (step S170), and external charge end processing is executed (step S180). Thereby, for example, internal operation such as relay release for shutting off an electric path of the external charge is executed.

In charging facility 300, whether or not the account settlement of the fee billed to electric powered vehicle 200 in step S350 has been completed is confirmed (step S270). When the account settlement completion is confirmed (YES is determined in S270), the external charge operation to electric powered vehicle 200 is finished. For example, the configuration can be such that a mechanism that locks the movement of electric powered vehicle 200 during external charge is provided, and at the end of the external charge operation accompanying the account settlement completion, the relevant lock mechanism is released.

While in the flowchart in FIG. 6, processing steps in the system configuration in which the selection and the transmission of the advertising information and the account settlement of the charging power fee are intensively managed by management server 410 are illustrated, in a case where the functions of management server 410 are arranged in a decentralized manner, processing steps may be employed in which part or all of step S300 to S330 may be executed by an arithmetic operation device such as a computer installed in another system component and the like.

Figure 7:
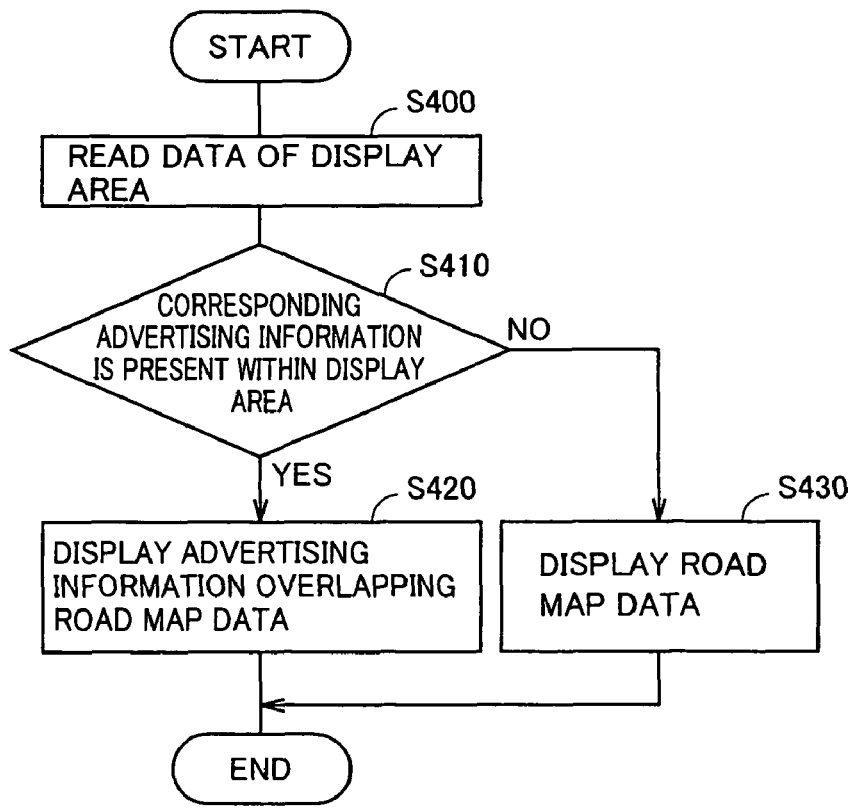
FIG. 7 is a flowchart showing a first example of reproduction processing of the advertising information in the electric powered vehicle.
Figure 8:
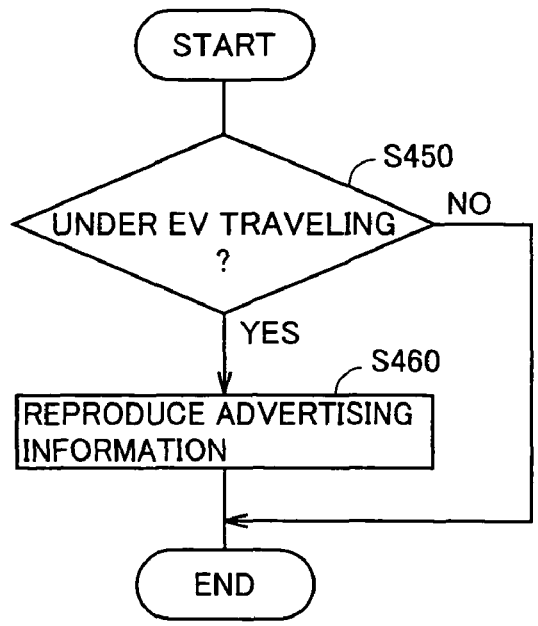
FIG. 8 is a flowchart showing a second example of the reproduction processing of the advertising information in the electric powered vehicle.

The advertising information received by electric powered vehicle 200 in step S160 of FIG. 6 is reproduced in electric powered vehicle 200 in accordance with an example of a series of processing shown in FIG. 7 or FIG. 8.

Processing in FIG. 7 corresponds to display processing in navigation system 305 shown in FIG. 3. Referring to FIG. 7, in step S400, navigation controller 310 (FIG. 3) reads road map data of a display area to be displayed on the screen of display 320 (FIG. 3) in accordance with a current position of electric powered vehicle 200. Furthermore, in step S410, navigation controller 310 determines whether or not one having position information corresponding to the current display area exists in the advertising information stored in storage portion 360.

If the advertising information having the position information within the display area is absent (NO is determined in S410), navigation controller 310, in step S430, displays the road map data within the display area as it is. In contrast, if the advertising information having the position information exists within the display area is present (YES is determined in S410), navigation controller 310 displays the advertising information with the advertising information overlapping the above-described road map data (step S420). This allows the reproduction of the advertising information to be realized as illustrated in FIG. 4. The advertising information may be outputted as audio information using speaker 325 (FIG. 3).

Alternatively, as shown in FIG. 8, in step S450, navigation controller 310 determines whether or not electric powered vehicle 200 is under EV traveling, and if it is under EV traveling (YES is determined in step S450), the advertising information stored inside the vehicle in advance is reproduced.

This allows the advertising information to be reproduced while limiting the reproduction time only to the EV traveling time. Alternatively, as described above, a time zone can be selected to reproduce the advertising information. Thus, for the reproduction of the advertising information, information for specifying which reproduction aspect is performed is included in the advertising information, which allows an appropriate reproduction aspect to be specified in accordance with the advertising object.

As described above, according to the charging system of the present embodiment, at least part of the fee of the charging power can be discounted for the electric powered vehicle user in exchange for the reception of the advertising information selected based on at least one of vehicle information ICR stored inside electric powered vehicle 200 to be charged and facility information IDC of relevant charging facility 300 at the time of external charge by charging facility 300.

As a result, by giving an economic merit to the electric powered vehicle user, incentive for external charge can be enhanced. Moreover, the advertising provider side, based on vehicle information ICR and/facility information IDC, can appropriately select the electric powered vehicle that can be expected with respect to advertising effect and send the advertising information, which makes easy the acquisition of advertising provider 420 to charging system 100.

Furthermore, the motivation for the installation of the charging facility can be given because a business model by advertising income is also enabled, and contribution to popularization and expansion of the electric powered vehicle by well-developed infrastructure for external charge can also be expected.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A charging system of an electric powered vehicle configured to be chargeable by a charging facility outside the vehicle, comprising:
at least one processor; and
at least one memory, the memory storing instructions, that when executed, cause the at least one processor and the at least one memory to function as:
a storage unit storing a plurality of advertising information and a correspondence relation between each of said advertising information and a provider of the relevant advertising information in advance;
a first information output unit outputting information indicating whether or not the relevant electric powered vehicle has a reproduction mechanism capable of reproducing each of said plurality of advertising information at the time of an external charge in which said electric powered vehicle is charged by said charging facility;
a second information output unit outputting at least one of charged vehicle information stored inside the relevant electric powered vehicle and facility information of the relevant charging facility at the time of said external charge;
a determination unit determining whether or not it is external charge to the electric powered vehicle having said reproduction mechanism based on the information outputted from said first information output unit;
a selection unit selecting at least one of said plurality of advertising information based on the information outputted from said second information output unit when it is the external charge to the electric powered vehicle having said reproduction mechanism;
an advertising output unit reading the advertising information selected by said selection unit from said storage unit to output to said electric powered vehicle during said external charge; and
a billing unit performing billing to said provider and said electric powered vehicle so that at least part of an electric power fee in accordance with said external charge is borne by said provider corresponding to the advertising information selected by said selection unit.

2. The charging system of the electric powered vehicle according to claim 1, wherein said electric powered vehicle includes a mechanism for displaying said advertising information from said advertising output unit on a display screen of a navigation system, as said reproduction mechanism.

3. The charging system of the electric powered vehicle according to claim 2, wherein said advertising information includes position information, and is displayed in a position corresponding to the relevant position information on said display screen.

4. The charging system of the electric powered vehicle according to claim 2, wherein said charged vehicle information includes at least one of past traveling route information and destination information in said navigation system.

5. The charging system of the electric powered vehicle according to claim 2, wherein said navigation system has a search function of displaying a search result list in which according to an inputted search condition, a facility matching the inputted search condition is shown, and
said advertising information includes information for boosting up a display order of the corresponding facility in said search result list.

6. The charging system of the electric powered vehicle according to claim 2, wherein said facility information includes at least one of an installation place, an installation personnel and an owner of said charging facility, and an owner of said installation place.

7. The charging system of the electric powered vehicle according to claim 1, wherein said reproduction mechanism reproduces said advertising information outputted to said electric powered vehicle by said advertising output unit during a period when said electric powered vehicle is traveling using electric power.

8. The charging system of the electric powered vehicle according to claim 1, wherein said billing unit billing an advertising fee to said provider corresponding to the advertising information selected by said selection unit, and when said advertising fee is lower than said electric power fee, an amount obtained by subtracting said advertising fee from said electric power fee is billed to said electric powered vehicle.

9. The charging system of the electric powered vehicle according to claim 1, wherein said electric powered vehicle further comprises a storage portion storing information of a frequency with which said advertising information is received from said advertising output unit, and based on the information stored in said storage portion, said billing unit relatively increases an amount of electric power to be charged in accordance with the electric power fee billed to said provider, with respect to the electric powered vehicle that receives said advertising information with a relatively high frequency.

* * * * *